United States Patent Office 3,681,296
Patented Aug. 1, 1972

3,681,296
POLYMERIZATION OF 2-PYRROLIDONE USING AZETIDINONE CO-ACTIVATORS AND CARBON DIOXIDE AS ACTIVATOR
Robert E. Burks, Jr., Birmingham, Ala., assignor to Radiation Research Corporation, Stamford, Conn.
No Drawing. Filed Sept. 3, 1970, Ser. No. 69,499
Int. Cl. C08g 20/16
U.S. Cl. 260—78 P                                          7 Claims

ABSTRACT OF THE DISCLOSURE 2-pyrrolidone is polymerized in the presence of an alkaline polymerization catalyst, carbon dioxide, and an azetidinone-(2) of the formula:

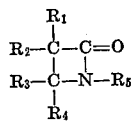

wherein $R_1$, $R_2$, $R_3$, $R_4$ and $R_5$ are independently hydrogen, $C_1$-$C_6$ alkyl, phenyl, $C_1$-$C_6$ haloalkyl, halophenyl and tolyl.

---

This invention relates to the polymerization of 2-pyrrolidone.

Methods for the polymerization of 2-pyrrolidone to form polypyrrolidone have been previously disclosed, for example, in U.S. Patents 2,638,463, 2,809,958 and 2,891,038. In general, these methods involve the polymerization of 2-pyrrolidone in the presence of an alkaline polymerization catalyst, and, usually, with an activator as well.

The polymer formed from 2-pyrrolidone is believed to be a linear polyamide, which has come to be known as nylon-4, having the structure:

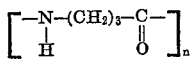

The polymer may be shaped into ribbons, films, molded articles and fibers. Because of its hydrophilic properties, which closely resemble those of cotton and silk, nylon-4 fiber has long been recognized as having a great commercial potential. For example, fabrics made from nylon-4, in contrast with other presently available synthetic fibers, are as readily dyed as cotton; they may be ironed at cotton temperatures; they rapidly dissipate static charges; and, in particular, they possess the comfort of cotton and wool.

Nylon-4 fiber has never been made commercially, however, primarily because efforts to manufacture the fiber by the economical melt spinning method have met with almost universal failure. In the copending application of Carl E. Barnes, Ser. No. 763,898, filed Sept. 30, 1968, entitled "Polymers of 2-Pyrrolidone," now abandoned, and in the continuation-in-part application thereof Ser. No. 69,471, filed Sept. 3, 1970, there is disclosed and claimed novel polymers of 2-pyrrolidone that can be converted into useful shaped articles such as fibers, filaments, rods, bristles, films, ribbons and the like, by the inexpensive method of melt extrusion.

The polymers of 2-pyrrolidone of the aforesaid Barnes applications exhibit a marked increase in heat stability as compared to prior art polymers, which is particularly important in the formation of fibers by melt extrusion.

The aforesaid Barnes applications disclose that the new nylon-4 polymers can be prepared by polymerizing 2-pyrrolidone using an alkaline polymerization catalyst in the presence of $CO_2$. For example, polymerization can be effected by bubbling $CO_2$ through a mixture of 2-pyrrolidone and an alkali metal salt of 2-pyrrolidone, e.g. sodium or potassium pyrrolidonate, the alkali metal pyrrolidonate functioning as an alkaline polymerization catalyst, and then polymerizing the carbonated mixture.

The new polymer of the Barnes applications can also be prepared by reacting $CO_2$ with the alkali metal salt of 2-pyrrolidone to form an adduct of $CO_2$ and the alkali metal pyrrolidonate, and then polymerizing the 2-pyrrolidone monomer in the presence of the adduct.

The specific details of the formation of the new nylon-4 using $CO_2$ can be found in the aforementioned Barnes applications, and therefore the polymerization procedure will only be briefly discussed herein. The reaction conditions for the polymerization of 2-pyrrolidone in the presence of $CO_2$ are essentially the same as that already described in the prior art. In general, 2-pyrrolidone monomer may be polymerized at a temperature from about 18° C. to about 100° C., preferably 25° C. to 70° C., and most preferably 25° C. to 60° C., under a pressure ranging from subatmospheric to superatmospheric in the presence of the alkaline polymerization catalyst. Bulk polymerization or suspension polymerization can be used. A technique using an anhydrous nonsolvent, such as hydrocarbon, is suitable, as described in U.S. Patent 2,739,959.

The catalyst may be any alkaline catalyst for polymerizing 2-pyrrolidone, such as those disclosed in previously mentioned U.S. Patent 2,638,463, except that the alkali metals or any other agent that may reduce the sensitive 2-pyrrolidone ring thereby introducing impurities which may be harmful to the polymerization reaction are not used. Suitable catalysts are derivatives of the alkali metals, e.g. the hydrides, hydroxides and oxides of the alkali metals. The alcoholates of the alkali metals, such as sodium methylate, or a quaternary ammonium base as described in U.S. Patent 2,973,343 of the formula:

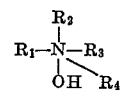

wherein $R_1$, $R_2$ and $R_3$ are lower alkyl radicals and $R_4$ is an alkyl, aryl or aralkyl radical, may be used with good results. The aforesaid Barnes applications provide a complete description of the large number of alkaline polymerization catalysts that can be used.

The catalyst may be used in an amount of 0.5 to 50% by weight, based on the 2-pyrrolidone monomer, preferably 5 to 30 wt. percent, most preferably 8 to 20 wt. percent.

The amount of carbon dioxide can also be expressed as a mol percent of the mols of alkaline polymerization catalyst. The amount of carbon dioxide would thus be from about 0.06 to 60 mol percent, based on the mols of the alkaline polymerization catalyst, but higher amounts, e.g. up to about 80 mol percent $CO_2$ based on the mols of alkaline polymerization catalyst have been used. Generally, the amount of $CO_2$ on a molar basis will be from 10 to 80 mol percent, based on the mols of alkaline polymerization catalyst.

It is possible to introduce $CO_2$ into the system other than by bubbling $CO_2$ into the mixture of 2-pyrrolidone and alkaline polymerization catalyst. For example, the source of $CO_2$ can be a compound that will transfer $CO_2$ to the mixture of 2-pyrrolidone monomer and alkaline polymerization catalyst, provided that the anion remaining after loss of $CO_2$ from the compound is not deleterious to the polymerization. Adducts of carbon dioxide and an alkali metal or quaternary ammonium pyrrolidonate can be added to a mixture of 2-pyrrolidone monomer and alkaline polymerization catalyst, as can adducts of $CO_2$ and an alkali metal or quaternary ammonium caprolactamate, with or without any $CO_2$ gas added to the system. These aducts are added to the system on the same weight basis as the $CO_2$.

A convenient method for preparing the adducts is to bubble $CO_2$ through an anhydrous mixture of the pyrrolidonate and 2-pyrrolidone under vacuum until there is a sharp rise in pressure indicating that the $CO_2$ is no longer being readily absorbed. The adduct is precipitated by adding benzene or other organic precipitant to the solution. There is recovered from the precipitate a free-flowing, non-hygroscopic, white powder. Alternatively, the organic precipitant can be added to an anhydrous solution of pyrrolidonate in 2-pyrrolidone before the $CO_2$ is bubbled through the solution, in which case the precipitate forms as the $CO_2$ is absorbed.

Since it is necessary to react $CO_2$ with anhydrous pyrrolidonate, it is preferred to form the $CO_2$-pyrrolidonate adduct by adding $CO_2$ to an anhydrous solution of pyrrolidonate in 2-pyrrolidone, where the pyrrolidonate is formed in situ as described above.

In a similar manner, the adduct of $CO_2$ and caprolactamate is formed by bubbling $CO_2$ though an anhydrous solution of caprolactamate in caprolactam and adding the organic precipitant before or after the $CO_2$ addition. Generally, when the caprolactamate is formed in situ, temperatures in excess of 90° C. are avoided.

It is desirable to carry out the polymerization in the substantial absence of water, although anhydrous conditions are not essential; e.g. the amount of water should not exceed about 0.1% by weight of the 2-pyrrolidone monomer.

The preferred proportion of $CO_2$ and polymerization catalyst is about 2 mols of the catalyst per mol of $CO_2$. The temperature at which the $CO_2$ is added to the catalyst may be varied widely, good results having been obtained at temperatures ranging from 18° C. (approximately the freezing point of the solution of the catalyst in monomer) to 130° C. or higher.

Suitably, the 2-pyrrolidone monomer will be contacted with 0.01 to 10 wt. percent of $CO_2$, based on the weight of the 2-pyrrolidone monomer. Presently preferred amounts are 0.2 to 6 wt. percent, based on the weight of the 2-pyrrolidone, while 0.5 to 5 wt. percent are the most preferred amounts.

It has now been found that the rate of polymerization can be increased while still maintaining the production of high molecular weight polymer if the polymerization of 2-pyrrolidone is conducted in the presence of an alkaline polymerization catalyst, $CO_2$ and an azetidinone-(2) of the formula:

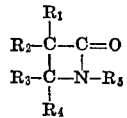

wherein $R_1$, $R_2$, $R_3$, $R_4$ and $R_5$ are independently hydrogen, $C_1-C_6$ alkyl, phenyl, $C_1-C_6$ haloalkyl, halophenyl and tolyl. As used herein, the term "azetidinone" is intended to mean the azetidinone-(2) defined above.

The use of azetidinones as polymerization activators in the polymerization of pyrrolidone has been proposed in German Patent 1,134,828, but not with $CO_2$ as a coactivator. In the absence of $CO_2$, azetidinones function as polymerization activators, but the conversions are low and the molecular weight of the polymer is also low. In the absence of azetidinones, $CO_2$ gives high molecular weight polymers at moderate conversion rates. Together, an azetidinone and $CO_2$ coact to provide high molecular weight polymers at high conversion in a fraction of the time it takes when $CO_2$ is used alone.

The amount of azetidinone should be less than about 0.80 mol per mol of alkaline polymerization catalyst, since at such high levels of azetidinone, the effect of the azetidinone acting by itself is more strongly felt and the conversion rate and polymer molecular weight tend to fall. A minimum amount of about 0.004 mol of azetidinone per mol of alkaline catalyst is suitable. A molar ratio of azetidinone to alkaline polymerization catalyst of about 0.60 or less is suitable, preferably about 0.06 to about 0.60, most preferably about 0.10 to about 0.40.

The particular azetidinone employed can be any of those within the general formula above, such as those carrying a simple alkyl or aryl radical in 3- or 4-position, in particular 4-methylazetidinone-(2), 4-isopropylazetidinone-(2), 4-phenylazetidinone-(2), 4-p-tolylazetidinone-(2), 4-p-chlorophenylazetidinone-(2), 3,3-dimethylazetidinone-(2), and 4,4-dimethylazetidinone-(2). It is preferred to use 4,4-dimethylazetidinone-(2). In general, it is preferred to use the simpler derivatives, wherein $R_5$ is hydrogen and at least two of $R_1-R_4$ are also hydrogen, with the other two being phenyl, halophenyl, tolyl or $C_1-C_3$ alkyl.

A preferred procedure is to use the alkali metal salt of 2-pyrrolidone as the alkaline polymerization catalyst, and to form the salt in situ by heating under vacuum a mixture of 2-pyrrolidone and an alkali metal hydroxide and removing the water thus formed, if desired. The azetidinone is then added to the mixture of 2-pyrrolidone and salt thereof, and dry $CO_2$ gas is bubbled through the mixture until the pressure sharply rises indicating that $CO_2$ is no longer being absorbed. Alternatively, the $CO_2$ gas can be added before the azetidinone, but preferably not to full saturation. In either case, the reaction mixture is then transferred to a polymerization oven maintained at 50° C. and polymerization proceeds without any further steps.

The present invention is illustrated by the following examples.

EXAMPLE 1

In Run 1, 25.0 ml. (27.5 g., 0.32 mol) of 2-pyrrolidone was heated with 1.95 g. (0.030 mol) of KOH (assay, 85%) at reduced pressure. Bumping was prevented by stirring. The water formed in the reaction was removed as the temperature was increased and the pressure was reduced. When the removal of water was essentially complete, the pyrrolidone vapor rose into the still head until it was about to distill. At this point the pot temperature was 92° C. and the pressure was 0.4 mm. Hg. Just before the pyrrolidone distilled, the heating mantle was removed, and an ice bath was placed on the still pot to cool the K-salt-pyrrolidone solution. When the temperature reached 24° C., the ice bath was removed, and dry nitrogen was admitted to the system. 4,4-dimethyl-2-azetidinone, 0.52 g. (0.0052 mol), was added, and the pressure was again reduced to 0.4 mm. Hg while the azetidinone was being stirred in. The ice bath was replaced, and carbon dioxide was admitted to the system by bubbling beneath the surface of the solution containing potassium pyrrolidonate, pyrrolidone, and the azetidinone. The amount of carbon dioxide absorbed was 14 millimols or 0.47 mol of $CO_2$ per mol of KOH. The polymerizate was poured into a 2-oz. polyethylene bottle and placed in an oven at 50° C. After 16 hours, the polymer was removed from the bottle, saw into strips, pulverized in a Wiley mill, extracted with water, and dried at 75° C. The conversion was 62% as calculated from the weight of washed and dried polymer multiplied by 100 and divided by the weight of sawed polymer. The inherent viscosity was 4.2 dl./g. measured at a concentration of 0.5 g. per deciliter in hexafluoroisopropanol at 25° C.

Run 1 was duplicated except that no $CO_2$ was added (Run 2) or no azetidinone was added (Run 3). The results of Runs 1, 2 and 3 are reported in Table I.

TABLE I

| Run | Additive to K-salt [a] and pyrrolidone | Polymerization time (hr.) | Conversion to nylon-4 (percent) | Inherent viscosity [b] (dl./g.) |
|---|---|---|---|---|
| 1 | 0.52 g. azet.[c] plus $CO_2$ | 16 | 62 | 4.2 |
| 2 | 0.55 g. azet | 96 | 25 | 1.6 |
| 3 | $CO_2$ | 96 | 64 | 4.3 |

[a] "K-salt" is potassium pyrrolidonate.
[b] Inherent viscosity all examples reported in deciliters per gram as determined at 25° C. in hexafluoroisopropanol at a concentration of 0.5 g. per deciliter.
[c] ("Azet." is 4,4-dimethyl-2-azetidinone.

EXAMPLE 2

The procedure of Run 1 of Example 1 was duplicated except that the amounts of KOH and 4,4-dimethyl-2-azetidinone were changed to determine the effect of the mol ratio of azetidinone to alkaline polymerization catalyst, and an effort was made to stop the polymerizations at about 20 hours to investigate the initial rate of polymerization. A control run was made using $CO_2$ but no azetidinone (Run 1). The results are reported in Table II below.

TABLE II

| Run | KOH (mols) | Azetidinone: (mols) | Molar ratio azetidinone: K-salt [1] | Polymerization time (hrs.) | Conversion (percent) | Inherent viscosity [1] |
|---|---|---|---|---|---|---|
| 1 | 0.029 | None | 0 | 21 | 46 | 5.0 |
| 2 | 0.029 | 0.00022 | 0.008 | 21 | 51 | 4.1 |
| 3 | 0.029 | 0.0019 | 0.07 | 21 | 62 | 4.1 |
| 4 | 0.029 | 0.0029 | 0.10 | 19 | 48 | 4.2 |
| 5 | 0.023 | 0.0038 | 0.17 | 16 | 63 | 4.3 |
| 6 | 0.029 | 0.0061 | 0.21 | 18 | 52 | 4.0 |
| 7 | 0.016 | 0.0038 | 0.24 | 17 | 69 | 4.0 |
| 8 | 0.010 | 0.0032 | 0.32 | 22 | 73 | 5.4 |

[1] See Example 1.

The polymerizations of Runs 1 and 8 of Example 2 were run in two samples each. The first samples were taken out of the polymerization oven after 21 and 22 hours respectively, as reported above in Table II. The second samples remained in the oven for 96 hours. After 96 hours the sample of Run 1 showed 64% conversion to a polymer of 4.5 inherent viscosity while the sample of Run 8 after 96 hours showed 77% conversion to a polymer of 4.9 inherent viscosity.

Examples 1 and 2 show that the addition of an azetidinone to a carbon dioxide polymerization increases the initial rate of polymerization as the molar ratio of azetidinone to alkaline polymerization catalyst is increased. While some decrease in polymer molecular weight may be encountered at low molar ratios of azetidinone to alkaline polymerization catalyst, the resulting polymer is still very high in molecular weight.

Example 1 dramatically shows that the use of azetidinone by itself, without $CO_2$, gives only low molecular weight polymer and that the use of azetidinone and $CO_2$ together can reduce the time to reach high conversion by a factor of about 6. It can be said, therefore, that azetidinone and $CO_2$ together are 600% more effective than $CO_2$ alone.

What is claimed is:

1. A process for the polymerization of 2-pyrrolidone to form a solid polymer, which comprises polymerizing 2-pyrrolidone in the presence of an alkaline polymerization catalyst, carbon dioxide as a polymerization activator, and an azetidinone-(2) of the formula:

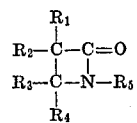

as a co-activator, wherein $R_1$, $R_2$, $R_3$, $R_4$ and $R_5$ are independently hydrogen or $C_1$-$C_6$ alkyl.

2. The process of claim 1, wherein the amount of said azetidinone is less than about 0.80 mol per mol of said alkaline polymerization catalyst.

3. The process of claim 2, wherein the amount of said azetidinone is from about 0.06 to about 0.60 mol per mol of said alkaline polymerization catalyst.

4. The process according to claim 1, wherein said azetidinone is selected from the group consisting of 4-methylazetidinone-(2), 4-isopropylazetidinone-(2), 3,3-dimethylazetidinone-(2), and 4,4-dimethylazetidinone-(2).

5. The process according to claim 1, wherein at least two of $R_1$, $R_2$, $R_3$ and $R_4$ are hydrogen with the other two being $C_1$-$C_3$ alkyl, and $R_5$ is hydrogen.

6. The process according to claim 1, wherein said alkaline polymerization catalyst is an alkali metal salt of 2-pyrrolidone and said azetidinone is 4,4-dimethylazetidinone-(2).

7. The process according to claim 1, wherein 2-pyrrolidone is heated under vacuum with an amount of an alkali metal hydroxide that is less than the stoichiometric amount necessary to convert all of the 2-pyrrolidone to the alkali metal pyrrolidonate, the resulting solution is admixed with said azetidinone, carbon dioxide is introduced into said solution and the resulting reaction mass is polymerized.

References Cited

UNITED STATES PATENTS 3,185,677  5/1965  Davis _____ 260—78 P

FOREIGN PATENTS 1,134,828  8/1962  Germany _____ 260—78 P

HAROLD D. ANDERSON, Primary Examiner

U.S. Cl. X.R.

260—33.4 R